Jan. 9, 1923.
H. L. LAVIETES.
WINDSHIELD CLEANER.
FILED JAN. 28, 1922.
1,441,593
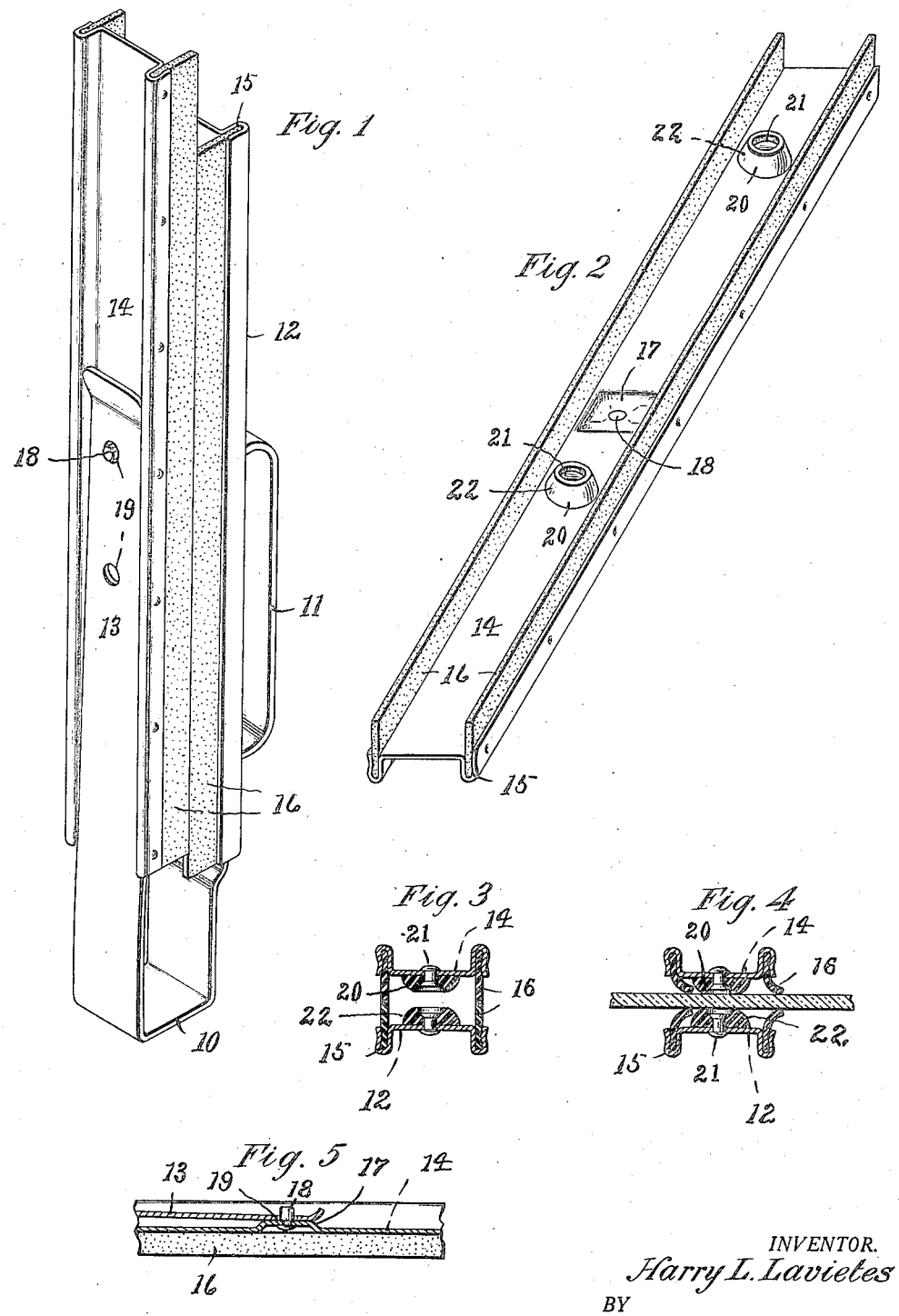
INVENTOR.
Harry L. Lavietes
BY
Chamberlain & Newman ATTORNEYS.

Patented Jan. 9, 1923.

1,441,593

UNITED STATES PATENT OFFICE.

HARRY LEWIS LAVIETES, OF NEW HAVEN, CONNECTICUT.

WINDSHIELD CLEANER.

Application filed January 28, 1922. Serial No. 532,375.

*To all whom it may concern:*

Be it known that HARRY LEWIS LAVIETES, a citizen of the United States, and resident of New Haven, in the county of New Haven and State of Connecticut, has invented certain new and useful Improvements in Windshield Cleaners, of which the following is a specification.

My invention relates to improvement on wind shield cleaners of the type shown and described in U. S. Patent to Pederson #1,370,909, dated March 8, 1921.

The construction of this type of wind shield cleaner as will be noted comprises an inner and outer wiper member designed to be positioned in alignment one with the other on opposite faces of a glass wind shield. These two members in part are constructed along somewhat similar lines and each include two parallel spaced apart flexible wiper strips, preferably formed of rubber, which serve to directly engage and be drawn across the face of a wind shield, so as to perform the actual wiping operations.

In practice I have found that by continued and abusive use, these rubber strips are frequently bent over at substantially right angles from their normal position, so that excessive wear and strain is brought upon the length of that portion of the strip immediately adjoining the side edges of the sockets in which the strips are supported. In this connection it will be obviously apparent that the strips will sooner or later break off or cut through, especially as the rubber becomes dry, or if perhaps they are very cold due to exposure to snow and ice.

The purpose therefore of my present invention is to provide means for wind shield wipers of this general type which will serve to protect the rubber wiper strips against being injuriously bent or deflected in their wiping operations, and better to support the strips in such positions in their wiping operations, as will insure a more effective cleaning of the glass, and further to provide this protecting means so that it will be more effective in its sidewise operative movements, and thereby better protect the article against abuse, and to prolong its life.

Fig. 1 shows a perspective view of a commercial type of wind shield cleaners, constructed along the lines of the patent referred to, and provided with my improvements;

Fig. 2 is a disconnected perspective view of one of the pair of wiper members shown in Fig. 1;

Fig. 3 is a cross sectional view of Fig. 1, the parts being normally positioned, and my protecting means applied between the two upper strips.

Fig. 4 is a somewhat similar cross section, the wiper member being shown applied to a part of a glass wind shield, and the wiper strips deflected as in use, and Fig. 5 shows a fragmentary longitudinal sectional view illustrating the detachable connection of the spring portion of the holder as applied to the outer wiper member.

Referring in detail to the characters of reference marked upon the drawing, 10 represents a holder for yieldably supporting the two wiper members in operative relation one to the other. This holder is preferably formed of a sheet metal strip and is bent to include a handle 11 which is secured to the inner wiper member 12 and has its opposite end portion 13 disposed to form a spring and provided with means for engaging and supporting the outer wiper member 14. The wiper members are similarly formed in that they each include a pair of parallel longitudinal grooves 15 to receive the wiper strips 16. As indicated in the drawings one of the longitudinal edge portions of each strip is positioned and secured in these grooves, and the other edges are disposed outward at a right angle to the face of the wiper members so that their edges will snugly engage the surface of the wind shield, in a manner to more thoroughly clean it when the device is drawn across its face. The handle portion of the holder is permanently secured to the inner wiper member in any preferred manner, whereas, the spring end portion 13 before referred to is detachably connected. This connection is formed by striking up an intermediate part of the metal of the wiper member 14 to form a raised bearing 17 which is provided with a fixed stud 18 to engage one of the holes 19 in the spring portion of the holder. This yieldable end portion of the holder is of a width proper to fit in channel of the sheet metal wiper member 14, and whereby it is given support and rigidity in addition to that obtained through the detachable engagement with the stud.

Referring more particularly to Figs. 2, 3 and 4, it will be seen that I have provided upon the inner faces of the wind shield members a series of supports 20, which may be formed of rubber or any other suitable material and preferably secured to the said wiper members by means of rivets 21. These supports are preferably arranged in alignment one with the other and intermediate of the two flexible wiper strips 16, so as to equally support either of the said strips as indicated in Fig. 4 when in use, and thereby prevent any sharp bending or breaking in that portion of the strip immediately adjoining the edges of the grooves in the upper members, in which the wiper strips are supported. It will also be noted that this particular arrangement of construction insures the deflection of the wiper strips in a position so that one edge portion of the same is first and most pressingly brought into contact with the glass so as to form a cleaning and scraping operation which would not be produced if the wiper strip were deflected over at a right angle and its flat face brought into contact with the glass.

While I have shown and described a circular form of support, yet it will be obvious of course, that they may be of any desired shape, and secured in any preferred manner. The outer edge portion of these supports may also be bevelled as indicated by 22, to better accommodate the edge of the strips.

Having thus described my invention what I claim, and desire to secure by Letters Patent is:

A wind shield wiper comprising a strip holder, a pair of longitudinal spaced apart flexible wiper strips supported by said holder and adapted to be flexed transversely thereof, and projecting means provided on said holder intermediate said wiper strips and terminating inwardly of the edges thereof to prevent engagement of said holder with the wind shield and to limit the flexing of said strips.

Signed at New Haven in the county of New Haven and State of Connecticut this 26th day of January, A. D. 1922.

HARRY LEWIS LAVIETES.

Witnesses:
 ISAAC AXEBROD,
 A. H. SABIN.